US008458760B2

(12) United States Patent
Jiang

(10) Patent No.: US 8,458,760 B2
(45) Date of Patent: Jun. 4, 2013

(54) SYSTEM AND METHOD FOR PRESENTING LOCATION DATA FOR BROADCASTED MEDIA

(75) Inventor: Libiao Jiang, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 967 days.

(21) Appl. No.: 12/061,129

(22) Filed: Apr. 2, 2008

(65) Prior Publication Data

US 2009/0254957 A1 Oct. 8, 2009

(51) Int. Cl.
*G06F 3/00* (2006.01)
*G06F 13/00* (2006.01)
*H04N 5/445* (2011.01)
*H04N 7/173* (2011.01)

(52) U.S. Cl.
USPC .......................................... 725/136; 725/37

(58) Field of Classification Search
None
See application file for complete search history.

(56) References Cited

U.S. PATENT DOCUMENTS

| 5,712,679 | A | * | 1/1998 | Coles | 348/158 |
| 6,005,504 | A | | 12/1999 | Hirono | |
| 6,868,169 | B2 | * | 3/2005 | Staas et al. | 382/113 |
| 2003/0202101 | A1 | * | 10/2003 | Monroe et al. | 348/156 |
| 2006/0123451 | A1 | * | 6/2006 | Preisman | 725/86 |

FOREIGN PATENT DOCUMENTS

| WO | WO 0174078 A1 | 10/2001 |
| WO | WO 01/98925 A2 | 12/2001 |
| WO | WO 2007/004844 A1 | 1/2007 |

* cited by examiner

*Primary Examiner* — Mark D Featherstone
(74) *Attorney, Agent, or Firm* — Fitch, Even, Tabin & Flannery LLP

(57) ABSTRACT

System and method for providing location data associated with broadcasted media to a display device. In one embodiment, the method may include receiving broadcasted media data over a communication network connection, displaying the received media data on a display device and receiving location data associated with the broadcasted media data. The method may further include displaying a graphical representation of the location data on the display.

16 Claims, 6 Drawing Sheets

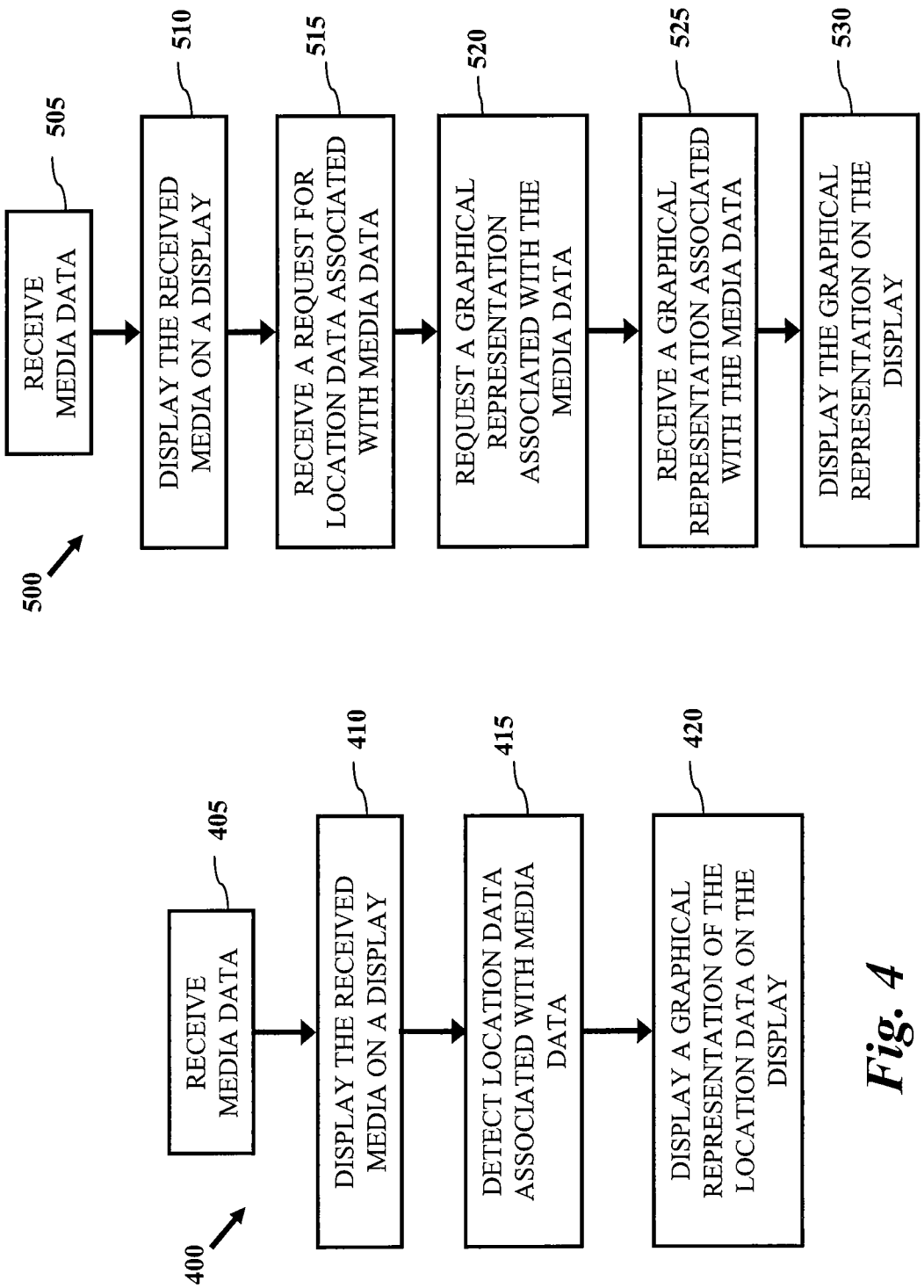

SYSTEM AND METHOD FOR PRESENTING LOCATION DATA FOR BROADCASTED MEDIA

FIELD OF THE INVENTION

The present invention relates in general to displaying broadcasted media and more particularly to a system and method for displaying location data related to broadcasted media.

BACKGROUND

Media outlets provide content to viewers in many forms. Broadcasted content for example, may be used by viewers to receive news, weather advisories and provide entertainment value. The increase of programming available in recent years may be an indication of an increase in popularity among viewers.

In the broadcast industry there is an ever present desire to provide content that viewers will tune into and will keep viewers watching. Similarly, many viewers may find content or programs entertaining that relate to personal interests or current events. As such, many viewers may be interested in knowing the location of programs or media content received. Broadcasters have employed electronic program guide data to provide information with broadcasted media content. However, guide data is usually limited to a generic description of media content and may not be useable to provide sufficient descriptive material. Further, guide data traditionally transmitted through broadcast channels for live broadcasts may not provide location data for multiple features. Accordingly, there is a need for a way to provide location data associated with broadcasted media content.

BRIEF SUMMARY OF THE INVENTION

Disclosed and claimed herein are a system and method for providing location data associated with broadcasted media to a display device. In one embodiment, a method includes receiving broadcasted media data over a communication network connection, displaying the received media data on a display device and detecting location data associated with the broadcasted media data. The method may further include displaying a graphical representation of the location data on the display.

Other aspects, features, and techniques of the invention will be apparent to one skilled in the relevant art in view of the following detailed description of the invention.

BRIEF DESCRIPTION OF THE DRAWINGS

FIG. 4 depicts a process for displaying location data according to one or more embodiments of the invention;

FIG. 5 depicts a process for displaying location data according to one or more embodiments of the invention.

DETAILED DESCRIPTION OF EXEMPLARY EMBODIMENTS

The present disclosure relates generally to providing location data associated with broadcasted media. In certain embodiments, location data may be transmitted with broadcasted media, or alternatively retrieved based on the media received.

One aspect of the present invention is directed to providing location data associated with media in a broadcasted media stream to a display device over a broadcast communication network connection. In one embodiment, media may relate to live broadcasts and/or pre-recorded media including location data. Location data may be decoded from a broadcasted media stream by an end user device. In one embodiment, location data may be presented as a graphical representation and/or map of a location associated with the media data. According to another embodiment, a process may be provided for displaying location data received with a media stream.

Another aspect of the invention is directed to retrieving location data associated with received media. In one embodiment, a system may be configured to retrieve location data associated with a received media broadcast. The system may be configured to retrieve a graphical representation of the location associated with received media. For example, a map corresponding to a location of interest in association in the media broadcast may be displayed. According to another embodiment, a process may be provided for retrieving location data associated with a media stream.

According to another aspect of the invention, a system and method may be provided for collecting location data associated with media data. In one embodiment, media captured by an imaging device may be associated with one or more measurements associated with the location of the imaging device. In this fashion, location data including, but not limited to, global positioning data may be provided with the recorded media.

When implemented in software, the elements of the invention are essentially the code segments to perform the necessary tasks. The program or code segments can be stored in a processor readable medium. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Figure 1A:
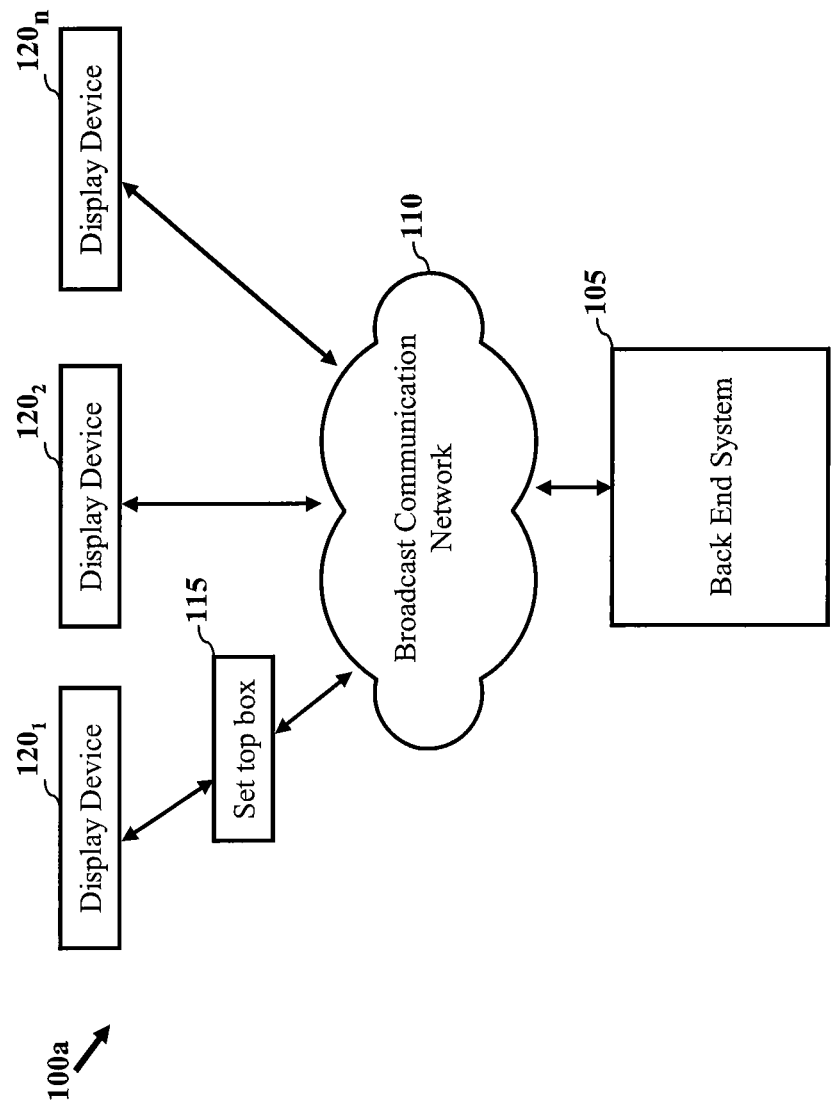
FIGS. 1A-1B depict embodiments of simplified system diagrams of one or more aspects of the invention.
Figure 1B:
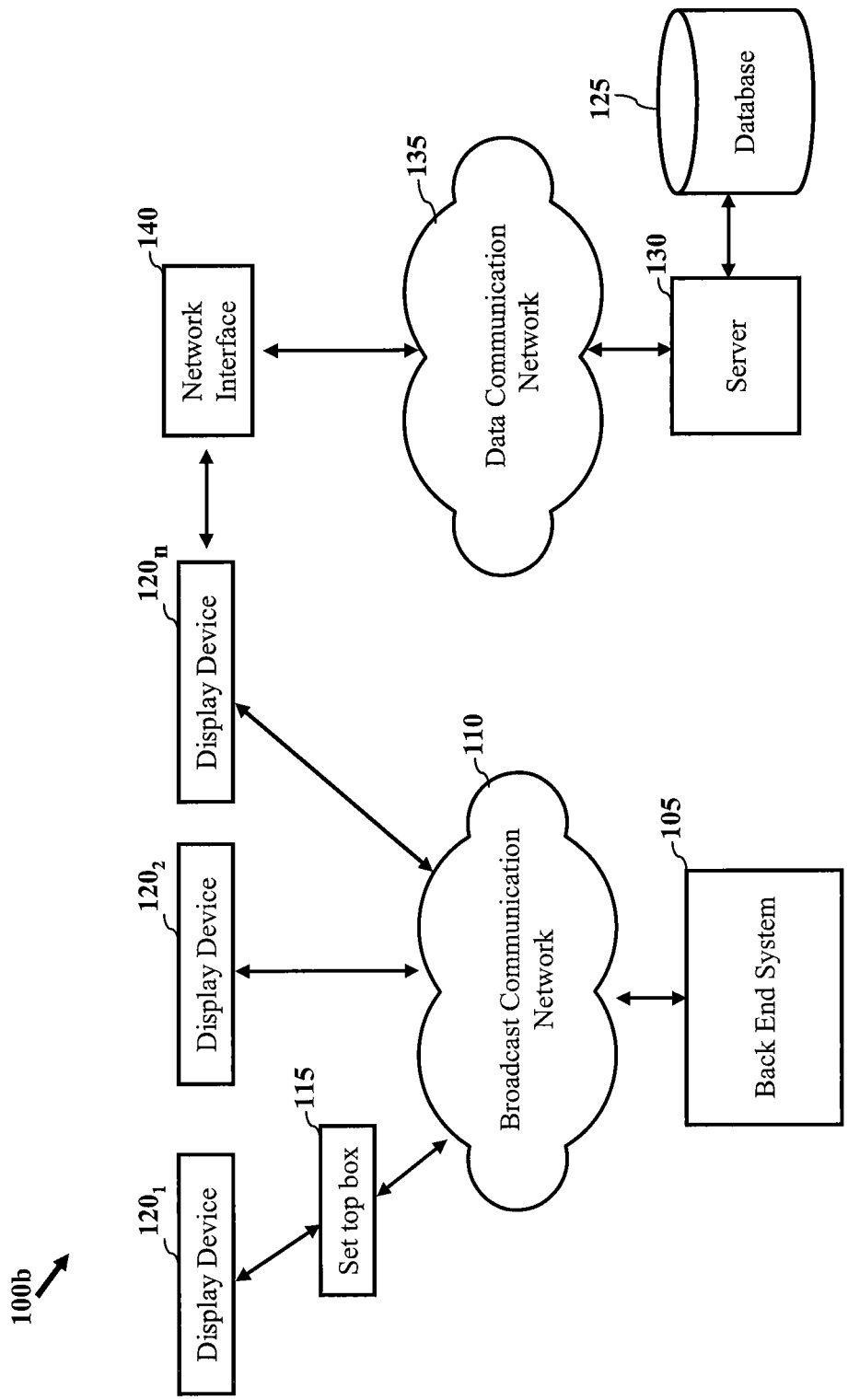

Referring now to the drawings, FIGS. 1A-1B illustrate simplified block diagrams a system according to one or more embodiments of the invention. Referring first to FIG. 1A, a simplified block diagram is shown of system 100a configured to transmit media according to one embodiment of the invention. As shown in FIG. 1A, system 100a includes back end system 105 coupled to broadcast communication network 110. In one embodiment, back end system 105 configured to receive media for transmission over broadcast communication network 110 to at least one of a plurality of display devices $120_{1-n}$. Back end system 105 and broadcast communication network 110 may be used to provide media corresponding to a multitude of forms (e.g., National Television Standards Committee (NTSC), PAL, Digital Satellite System (DSS), Digital Broadcast system (DBS), Advanced Television Standards Committee (ATSC), Internet Protocol Television (IPTV), etc.). It may also be appreciated that back end system 105 may be configured to transmit live and/or pre-recorded media.

According to another embodiment, broadcast communication network 110 may relate to a wired, or wireless network. As such, data links shown in FIG. 1A, may correspond to one or more of a telephone line, coaxial line, a fiber optic data line and radio frequency (RF) links. According to another embodiment, broadcast communication network 110 may be configured to transmit additional data in conjunction or separately from media transmitted by broadcast communication network 110. For example, metadata may be transmitted in conjunction or separately from media by broadcast communication network 110. According to another embodiment, media may be transmitted with an identifier which may be used to identify media streams.

According to another embodiment, display devices $120_{1-n}$ may coupled directly to broadcast communication network 110 and/or through an intermediary device to broadcast communication network 110. As shown in FIG. 1A, display device $120_1$ is coupled to broadcast communication network 110 via set top box 115. In one embodiment, set top box 115 may correspond to one of a set top box, television tuner and any television middleware device in general. In one embodiment, back end system 105 may be configured to transmit location data associated with transmitted media. In certain embodiments, display devices $120_{1-n}$ may be configured to decode transmitted media and/or location data. As such, display devices $120_{1-n}$ may be configured to display media received from back end system 105 including location data. According to another embodiment, set top box 115 may be used to decode transmitted media data and/or location data for display device $120_1$. In certain embodiments, display devices $120_{1-n}$ may be configured to display location data when activated by a user. In other embodiments, location data may be displayed automatically by display devices $120_{1-n}$. based in part on media received from back end system 105.

According to another embodiment, location data may be provided by a dedicated channel of a broadcasted media stream transmitted by back end system 105. In a further embodiment, location data associated with a particular channel may be transmitted in a separate dedicated channel associated with the particular channel. In that fashion, viewers of a particular channel on display device $120_1$ can request display of location data in a picture-in-picture window.

Referring now to FIG. 1B, a simplified block diagram is shown of another embodiment of the system in FIG. 1A. As shown in FIG. 1B, system 100b includes network interface 140 coupled to database 130 via a data communication network 135. In one embodiment, each of the display devices $120_{1-n}$ may be coupled to a network interface for retrieving location data from database 125. Network interface 140 may be configured to provide an internet interface for display devices $120_{1-n}$. As such, location data may be broadcasted to display devices $120_{1-n}$ by server 130. For example, network interface 140, server 130 and data communication network 135 may be configured to provide a broadband internet connection. According to another embodiment, network interface may be configured to request location data which may be stored on database 125 for display by display devices $120_{1-n}$. In one exemplary embodiment, network interface 135 may allow for graphical representations of location data to be retrieved from an online map application. Further, system 100b may be configured to support browsing, download, and/or streaming of content at display devices $120_{1-n}$ such as music videos, movie trailers, user-generated videos, personalized weather, traffic feeds, map applications, etc. In certain embodiments, network interface 135 may be embodied in display devices $120_{1-n}$ for communication data communication network 135.

Figure 2:
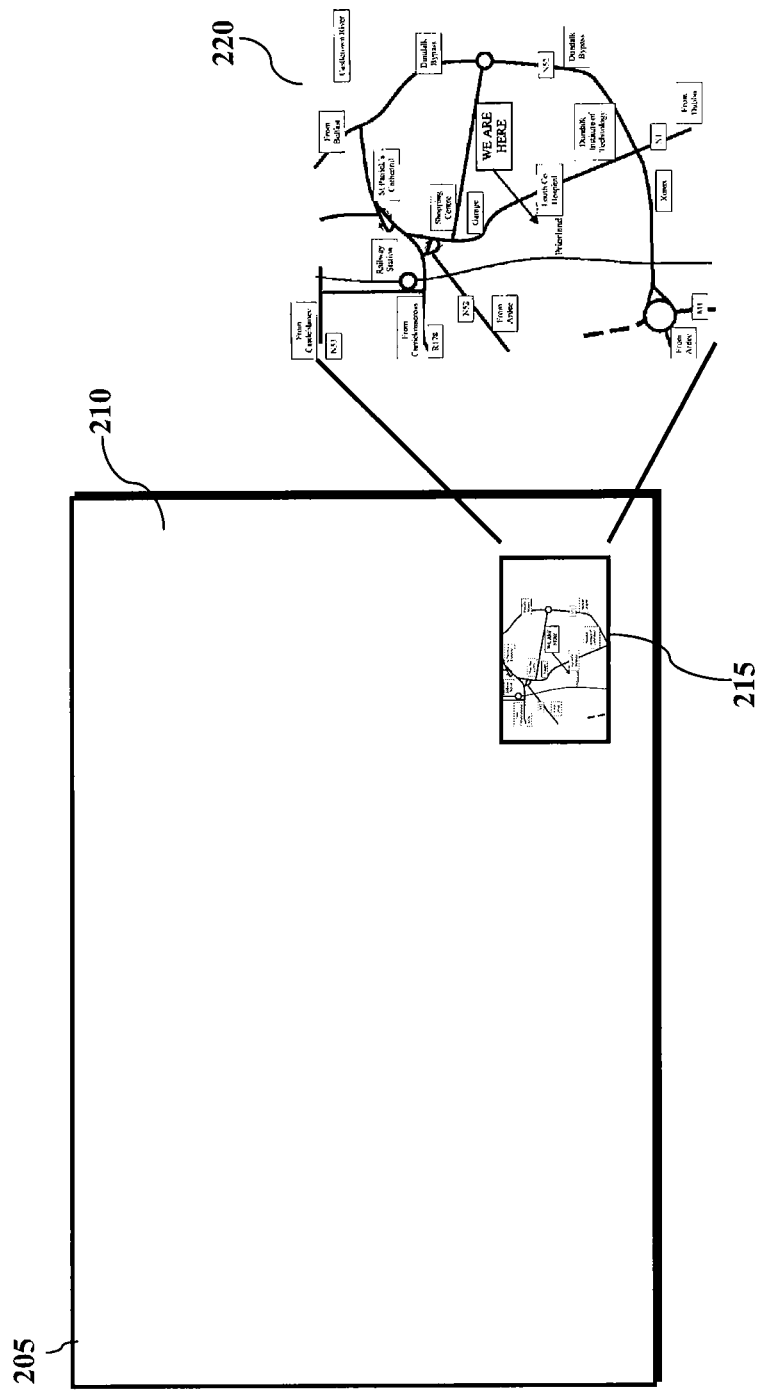
FIG. 2 depicts a graphical representation of a display window according to one or more embodiments of the invention.

Referring now to FIG. 2, a graphical representation is shown of a display window for a display device (e.g., display device $120_{1-n}$) according to one embodiment of the invention. As shown in FIG. 2, Display window 205 may present media, shown generally as 210, to one or more viewers according to one or more embodiments of the invention. Display window 205 may relate to the display window of a television, monitor, computer display and display device in general. Media 210 presented in display window 205 can relate to at least one of broadcast media, live television, pre-recorded television, internet based television, etc.

According to another embodiment of the invention, display window 205 may include presentation of a window 215 to include location data 220. As used herein location data may relate to at least one of a location name, map and/or positioning data associated with the displayed media 210. For example, location data 220 may relate to a location the media 210 is recorded. In certain embodiments, when media 210 relates to a television news broadcast, location data 220 may relate to a map indicating a location of a news story. When media 210 relates to a prerecorded video, such as a television show or film, location data may provide at least one of, the location depicted in the media, the actual location the media was recorded, a graphical representation of a plurality of locations depicted, etc. It may also be appreciated that location data 220 may be displayed as one or more of a map, graphical representation and text. According to another embodiment, location data 220 may be displayed overlying a displayed media in one of a translucent and opaque fashion.

Display of location data 220 may be based on a user request or alternatively may be automatically displayed according to another embodiment of the invention. Further, location data 220 may be displayed continuously or intermittently. As shown in FIG. 2, location data 215 is shown in the bottom right corner of display window 205. However, it may be appreciated that window 215 may be displayed in a plurality of locations within display window 205. Further, location data 220 may be displayed based on one or more user defined parameters. For example, in certain embodiments location data 220 may be displayed throughout display window 205. According to another embodiment, window 215 may relate to a picture in picture window. Further, it may be appreciated that display window 205 may be configured to display additional information including but not limited to a date, news alerts, weather information, messages, advertisements, stock quotes, sporting event scores, lottery results, real-time traffic information, etc.

Figure 3:
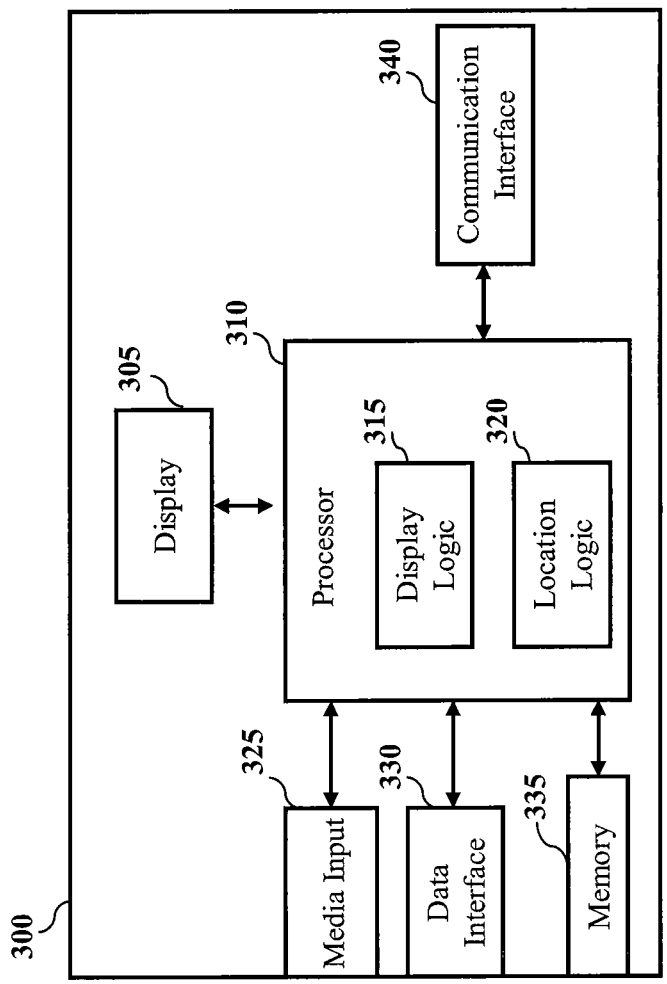
FIG. 3 depicts a simplified block diagram of a display device according to one or more embodiments of the invention.

Referring now to FIG. 3, a simplified block diagram is shown of a display device as may be employed by systems of FIGS. 1A-1B. As shown in FIG. 3, display device 300 includes processor 310 coupled to display 305, media input 325 and data interface 330. Display device 300 can relate to one or more of a television, monitor, computer display and display device in general. In one embodiment, display logic 315 of processor 310 may be configured to output one or more signals to display media data received by media input 325 for presentation on display 305. According to another embodiment, location data may be received by data interface 330. Processor 310 may include location logic 320 for providing one or more or more signals to display 305 for presentation of location data, such as map information associated with received media data. Location logic 330 may further be configured to provide a graphical representation of location data. For example, in one embodiment, location logic 330 may generate a graphical representation of a map based on coordinates received for a particular location.

According to another embodiment, display device 300 may be configured to receive a user request for location data related to received media, such as a remote control or input terminal (not shown) via communication interface 340. Communication interface 340 may be configured to enter user preferences into display device 300, which may be stored by memory 335. In one embodiment, communication interface 340 may be employed by a user of display device 300 to issue commands and/or provide a graphical user interface (GUI).

According to another embodiment, communication interface 340 may be employed to request map data associated with a particular received media. In certain embodiments, location logic 320 may be configured to decode location data from a received media stream. However, it may also be appreciated that display device 300 may communicate with a server via data interface 330 and or communication interface 340 to request and receive location data. In that fashion a user may request location data using communication interface 340. Memory 335 may be configured to store received location data.

Referring now to FIG. 4, a process is shown for displaying location data on a display device (e.g., display device $120_{1-n}$ or 300) according to one or more embodiments. Process 400 may be initiated by receiving media data at block 405. Media data received at block 405 may relate media corresponding to a multitude of forms (e.g., National Television Standards Committee (NTSC), PAL, Digital Satellite System (DSS), Digital Broadcast system (DBS), Advanced Television Standards Committee (ATSC), Internet Protocol Television (IPTV), etc.) In certain embodiments, media received at block 405 may include location data, such as mapping data. Location data received at block 405 may be included in a broadcasted media stream as one of map data, a graphical representation, and/or coordinates associated with the media. In certain embodiments, a broadcast news channel may include map data interleaved with a broadcast media stream provided by a back end system (e.g., back end system 105).

At block 410 of process 400, the received media may be presented to a user on the display device. At block 415, location data associated with the media data may be detected. According to one embodiment, location data may be identified in block 415 based on a software flag and/or data structure. In a further embodiment, location data identified in block 415 may conform to a standard format to facilitate transmission and/or detection by a plurality of broadcasting entities and/or manufacturing entities, respectively.

In one embodiment, location data detected at block 415 may be used to generate a graphical representation of the location data, such as a map image. According to another embodiment, map images may be generated by a processor (e.g., processor 310) of a display device (e.g., display device $120_{1-n}$ or 300) and/or a set top box (e.g., set top box 115) coupled to the display device. The graphical representation of location data may be displayed at block 420. Display of the graphical representation of location data and/or map images may be based, at least in part, on user settings and or a user request. For example, a user watching a media broadcast may request for location data to be displayed while viewing the media broadcast. The graphical representation of location data may be displayed at block 420 based on a user input on an interface (e.g., communication interface 340) of a display device. According to another embodiment, map image data generated by process 400 may be manipulated by a user of the display device. To that end, a graphical representation and/or map image displayed at block 420 may be enlarged to facilitate viewing by a user based on a command received by an interface of a display device.

Referring now to FIG. 5, a process is shown for displaying location data on a display device according another embodiment of the process of FIG. 4. Process 500 may be initiated by receiving media data at block 505. At block 510, the received media may be presented on a display device (e.g., display device $120_{1-n}$ or 300). In certain embodiments, a user can request for location data associated with the broadcast stream to be displayed at block 515. For example, it may be desirable to view a map of the location for a current news story that may be displayed. However, some broadcasted media streams may not include location data or map data. As such, it may be required to retrieve location data and/or map data associated with a particular media stream. According to one embodiment, location data such as a map image and/or a graphical representation of the location associated with a media stream and/or content provided in the media stream may be requested by the display device at block 520.

In one embodiment, a graphical representation and/or map data may be requested from a database (e.g., database 125) of a mapping application server (e.g., server 130) over a data communication network (e.g., data communication network 135). According to one embodiment, the graphical representation and/or map data may be requested using an identification code associated with the received media. For example, media received at block 505 may include an identifier and/or identification code which may be unique to the received media. At block 525, the graphical representation and/or mapping data associated with the received media maybe received by a display device. A received graphical representation and/or map image may be displayed at block 530.

Figure 6:
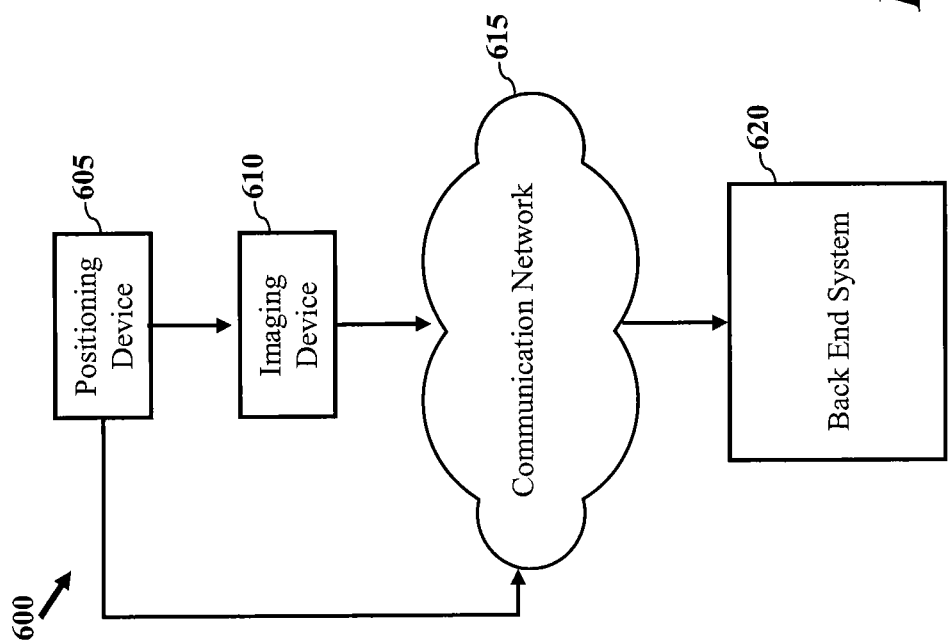
FIG. 6 depicts a simplified block diagram of a system according to one or more embodiments of the invention.

Referring now to FIG. 6, a simplified block diagram is shown of a system according to another aspect of the invention. As shown in FIG. 6, system 600 may include imaging device 610 configured to capture, and/or record, media data including video and imaging data in general. System 600 may also include positioning device 605 which may be configured to detect a position of the imaging device 610. According to another embodiment of the invention, the location of imagining device 610, as sensed by position sensor 605, may be provided to the imaging device and/or transmitted to a back end system 620 over data communication network 615. In that fashion, positioning information may be provided for recorded media data. In certain embodiments, imaging device 610 may be configured to encode position data into image data as it is recorded. In further embodiments, location data may be encoded into image data in real-time such that location data may be provided for real-time broadcasts. In addition, it may be appreciated that location data may be encoded into a broadcast channel employed for transmitting video and/or audio transmitted by imaging device 610 to back end system 620. To that end, positioning data may be provided with a broadcast media stream.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing location data associated with broadcasted media to a display device, the method comprising the acts of:
 receiving broadcasted media data over a communication network connection, wherein the media data relates to at least one of: television, internet protocol (IP) television and video data;
 displaying the received media data on a display device;
 detecting, with a position sensor, location data associated with a location where the broadcasted media data is recorded;
 encoding the location data into the broadcasted media data; and
 displaying the location data on the display via a graphical representation that relates to a map image of a location associated with the location data, and wherein the graphical representation is displayed simultaneously overlaying the received media data.

2. The method of claim 1, wherein the location data relates to at least one of map coordinates, and global positioning system (GPS) data.

3. The method of claim 1, further comprising:
 receiving location data over the communication network connection; and
 extracting the location data from the received media data.

4. The method of claim 1, further comprising requesting the location data from a server over a data communication network.

5. The method of claim 1, further comprising generating the graphical representation based, at least in part, on the location data.

6. The method of claim 1, wherein the graphical representation is displayed simultaneously over the media data in one of a translucent and opaque fashion.

7. The method of claim 6, wherein the graphical representation of the location data is displayed one of continuously and intermittently.

8. A display device configured to provide location data associated with broadcasted media, the display device comprising:
 a display;
 a media input configured to receive broadcasted media data, wherein the media data relates to at least one of: television, internet protocol (IP) television and video data; and
 a processor coupled to the display and media input, the processor configured execute processor executable instructions to:
 output media data received by the media input to the display;
 detect location data associated with a location where the broadcasted media data is recorded, wherein the location data is determined with a position sensor and encoded into the broadcasted media data; and
 display the location data on the display via a graphical representation that relates to a map image of a location associated with the location data, and wherein the graphical representation is displayed simultaneously overlaying the received media data.

9. The display device of claim 8, wherein location data relates to at least one of map coordinates, and global positioning system (GPS) data.

10. The display device of claim 8, wherein the processor is further configured to:
 receive location data over the communication network connection; and
 extract the location data from the received media data.

11. The display device of claim 8, wherein the processor is further configured to request location data from a server over a data communication network.

12. The display device of claim 8, wherein the processor is further configured generate the graphical representation based, at least in part, on the location data.

13. The display device of claim 8, wherein the graphical representation is displayed simultaneously over the media data in one of a translucent and opaque fashion.

14. The display device of claim 13, wherein the graphical representation of the location data is displayed one of continuously and intermittently.

15. A system for providing location data associated with broadcasted media to a display device, the system comprising:
 a back end system configured to transmit media data, wherein the media data relates to at least one of: television, internet protocol (IP) television and video data;
 a broadcast communication network configured to transport the media data; and
 a display device coupled to the broadcast communication network, the display device configured to:
 receive broadcasted media data;
 display the received media data on a display;
 detect location data associated with a location where the broadcasted media data is recorded, wherein the location data is determined with a position sensor and encoded into the broadcasted media data; and
 display the location data on the display via a graphical representation that relates to a map image of a location associated with the location data, and wherein the graphical representation is displayed simultaneously overlaying the received media data.

16. The system of claim 15, wherein location data relates to at least one of map coordinates, and global positioning system (GPS) data.

* * * * *